Sept. 23, 1924.  M. OSNOS  1,509,308

RADIO TRANSMISSION SYSTEM

Filed Aug. 8, 1922

INVENTOR
MENDEL OSNOS
BY
ATTORNEY

Patented Sept. 23, 1924.

1,509,308

UNITED STATES PATENT OFFICE.

MENDEL OSNOS, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

RADIO TRANSMISSION SYSTEM.

Application filed August 8, 1922. Serial No. 580,522.

*To all whom it may concern:*

Be it known that I, MENDEL OSNOS, of Russian nationality, residing at 12/13 Hallesches Ufer, Berlin, Germany, have invented certain new and useful Improvements in Radio Transmission Systems (for which I have filed application in Germany June 13, 1921); and I do hereby declare the following to be a full, clear, and exact description of the invention, of which the following is a specification.

In high frequency technics it often happens that two or more different transmitters are required to be used at the same time. For instance, it is often necessary to transmit simultaneously from Germany to "oversea" and to "Europe", naturally with quite different powers and frequencies. Up to now for the various purposes, different transmitting installations, each including a separate high frequency machine, have been provided. This, of course, increases the cost of the total plant.

According to the present invention, it is possible to obtain from one and the same high frequency machine two or more currents independent of each other without one of such currents affecting the other. In this manner, two or more transmitting installations may be supplied with power from a single high frequency machine.

A close investigation has shown that in the case of high frequency machines elements of the high frequency winding which lie on various circumferential parts of the stator are coupled with each other in a particularly loose manner, that is to say, if two of such winding elements are separated electrically from each other and if any power or current is supplied to one of the elements, this power is either not transmitted to the other element at all or is transmitted to it in a slight measure only. Moreover, the influence of the alternating current windings on the main field of the high frequency machine is extremely small, this being especially true in the case of the well-known high frequency machines of the so called O-type. In other words, if an electric power is supplied to a winding element of the high frequency machine or if any power is taken from one of such elements, the field induced in the machine by another winding element lying on another part of the circumference of the machine is not affected thereby.

Thus, according to the invention and according to the number of transmitting installations to be fed simultaneously from a single high frequency machine, the high frequency windings of the machine are divided into sections which are electrically independent of each other, and each section is connected separately to its respective transmitter or to the device, such, for example, as a transformer or frequency converter, which feeds the transmitter. For the various transmitters different frequency converters can be used, thereby enabling the frequency of the transmitters to be determined independently of each other. The invention is especially important under conditions in which the different transmitters have unequal transmitting powers, for instance, in ratios from 1:5 to 1:25. In such cases the various winding elements must be divided into correspondingly unequal sections, for example, by being built with unequal numbers of turns.

Referring to the accompanying drawing wherein I have shown my invention used in connection with a conventional type of inductor alternator:

S is the stator which may be provided with one or two toothed rims in which are winding elements $W_1$ and $W_2$. Each set of winding elements $W_1$ and $W_2$ are connected together to form coils $a$ and $b$. Each group of coils $a$ and $b$ are connected together to feed a different transmitter and are separated from each other in any possible manner to obtain a condition such that there is no mutual influence between the groups of coils $a$ and $b$.

Figure 1:
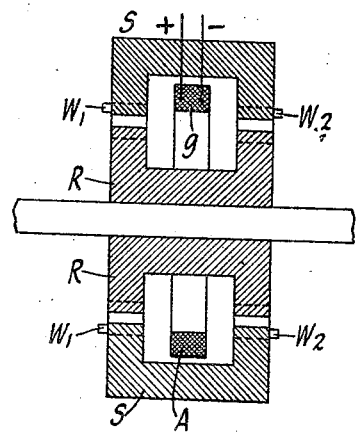
Fig. 1 is a longitudinal section of the inductor generator.
Figure 2:
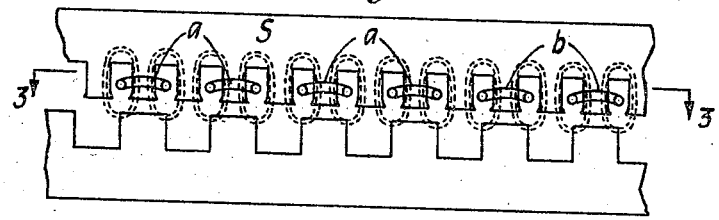
Fig. 2 is a side view of the stator developed into a plane.
Figure 3:
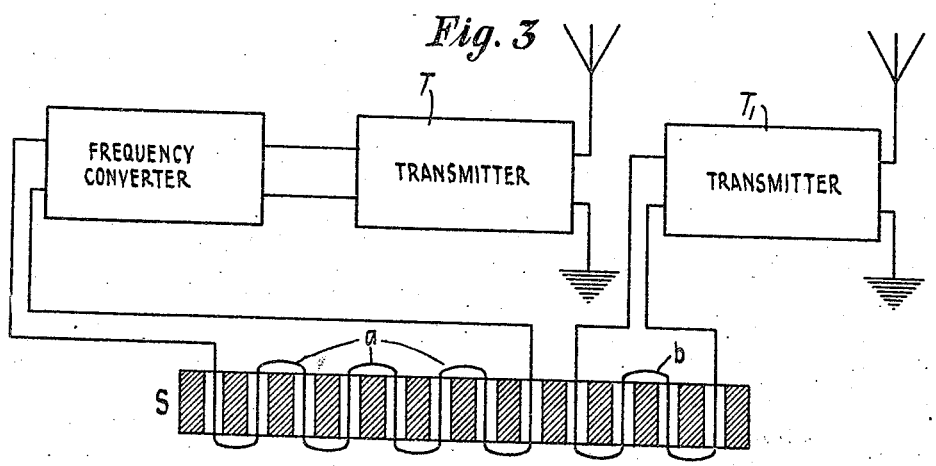
Fig. 3 is a section along the line 3—3 of Fig. 4 with the windings connected to separate transmitters.

Referring to Fig. 2 it will easily be seen that the high frequency fluxes set up by the high frequency windings and indicated by broken lines are practically confined to the teeth, in such a way that each individual coil drives or forces a magnetic flux across its tooth which returns thru the contiguous portions of the two adjacent teeth. It follows, therefor, that the individual coils have practically no reaction on one another. Hence, on varying the load on one of the winding systems, for example, between zero and full load, the sender connected to the other winding system will not be affected thereby.

Of course, it will be understood, as indicated above, that the independent senders simultaneously supplied in this manner from a single high frequency machine may be of any desired number, the high frequency winding being split into a corresponding number of winding systems a, b, etc., separated from one another and located at different points on the stator circumference. The winding systems may be connected to their respective senders or transmitters either directly, as in the case of the system of coils b, thru a frequency converter, as in the case of system of coils a, or thru a transformer (not shown).

Within a given winding system the different elements can be connected in various ways, in series, parallel, etc. Preferably, each individual system is built up of parts that are in symmetrical space relationship with one another.

In order that the speed of the high frequency machine may be independent of the load, and, consequently, also the voltage may be independent of the load, it is advisable to provide means for keeping the speed of the machine constant and independent of the load.

I claim as my invention:

1. A transmission system for wireless telegraphy and telephony comprising a plurality of transmitters, a high frequency machine having a winding composed of a plurality of sections electrically independent of each other, and separate connections between said sections and the transmitters for feeding the transmitters independently from the respective sections.

2. A transmission system for wireless telegraphy and telephony comprising a plurality of transmitters, a high frequency machine having a rotor, a stator, and a high frequency winding on the stator including a plurality of separate electrically independent sections arranged at different locations on the circumference of the stator, and connections for feeding the transmitters independently from said sections.

3. A transmission system for wireless telegraphy and telephony comprising a plurality of transmitters, a high frequency machine having a rotor, a stator, and a high frequency winding on the stator composed of a plurality of electrically independent sections, and connections for feeding the transmitters separately from said sections, at least one of said connections including a frequency converter for enabling the frequency radiated from the respective transmitter to be determined independently of the arrangement of the sections of the high frequency winding in the high frequency machine.

4. A radio transmission system comprising a plurality of transmitters, a high frequency machine of the inductor type having a winding composed of a plurality of sections electrically independent of each other, and separate connections between said sections and said transmitters for feeding the transmitters independently from the respective sections.

In testimony whereof I have signed my name to this specification.

MENDEL OSNOS.